June 14, 1927.
P. OLABARRIA
RIM TOOL
Filed Feb. 24, 1927
1,632,191
2 Sheets-Sheet 1
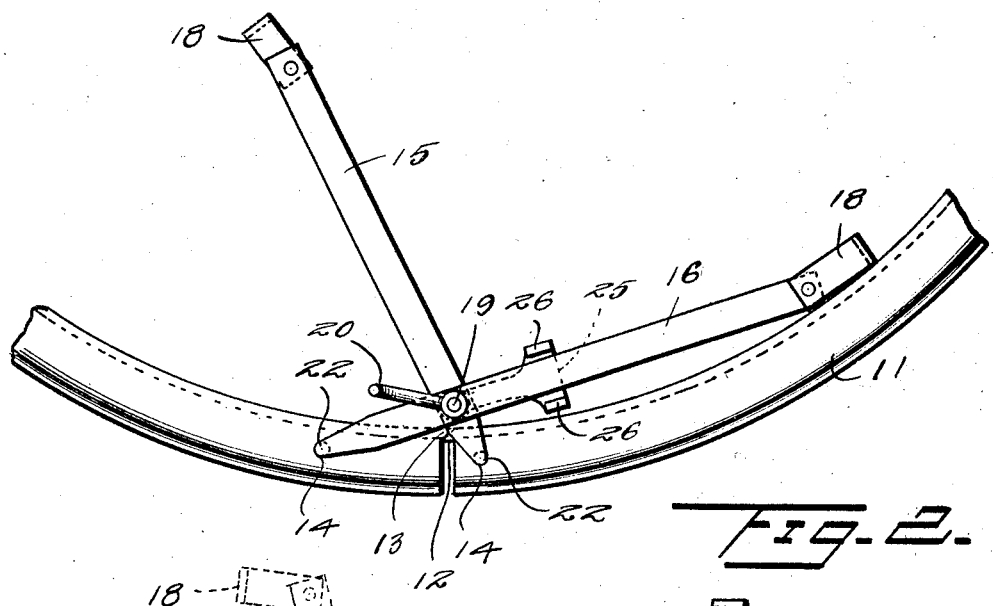
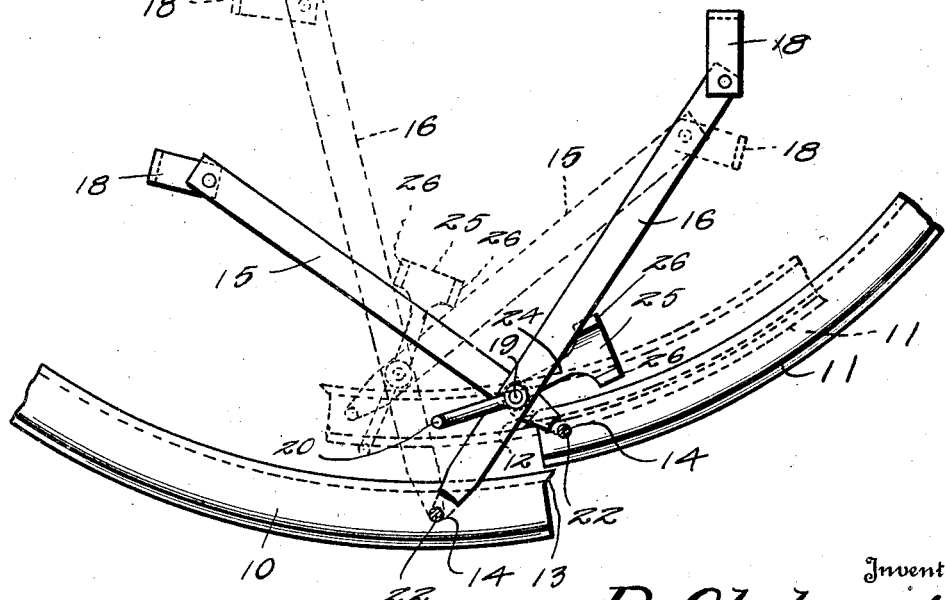
Inventor
P. Olabarria
By Watson E. Coleman
Attorney June 14, 1927.
P. OLABARRIA
1,632,191
RIM TOOL
Filed Feb. 24, 1927
2 Sheets-Sheet 2
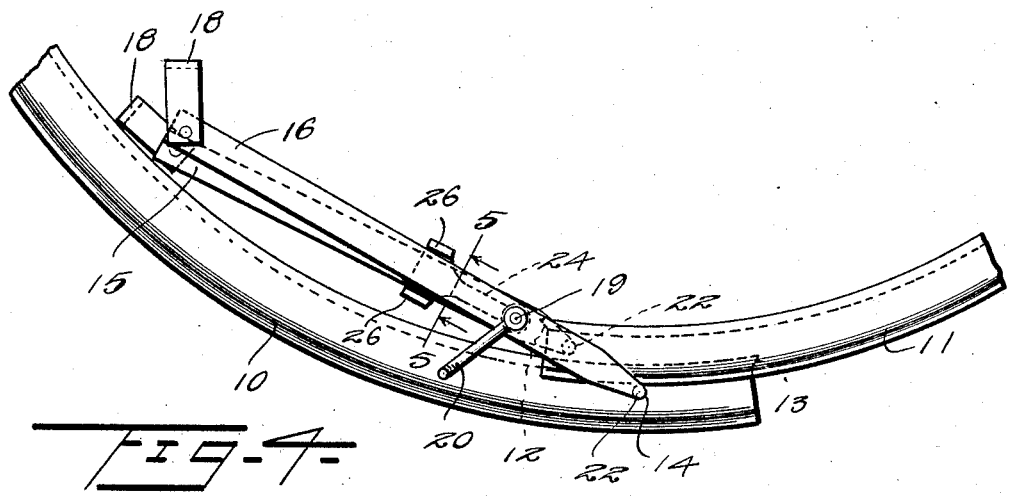
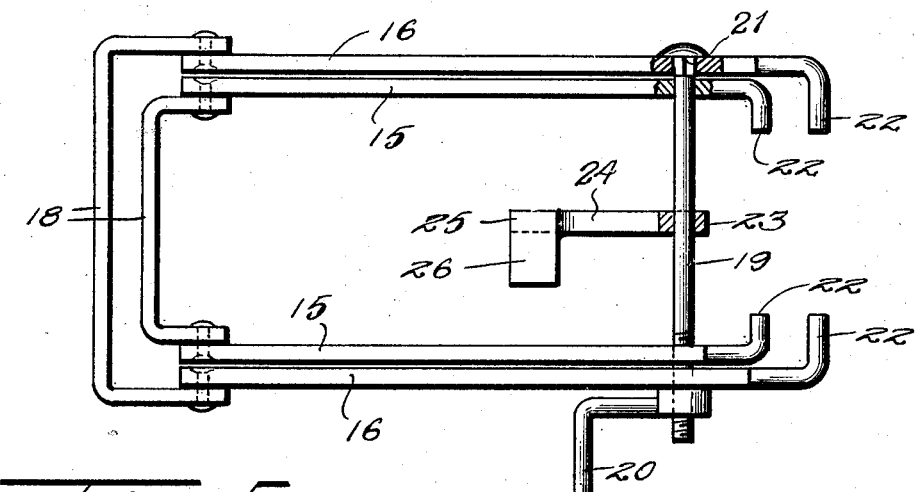
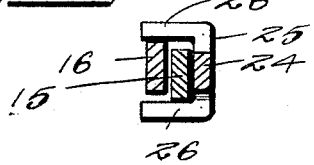
Inventor
P. Olabarria
By Watson E. Coleman
Attorney Patented June 14, 1927.

1,632,191

UNITED STATES PATENT OFFICE.

PETE OLABARRIA, OF ELKO, NEVADA.

RIM TOOL.

Application filed February 24, 1927. Serial No. 170,664.

This invention relates to rim tools and more particularly to a device for contracting resilient rims and holding the rims contracted while the tires thereof are removed and replaced.

An important object of the invention is to produce a device of this character capable of use with rims of different sizes and which may be readily applied to and removed from the rim.

A further object of the invention is to provide a device of this character which may be locked in position with the rim sections contracted and in which the locking adjustment may be varied to permit different adjustments or contractions of the rim.

These and other objects I attain by the construction shown in the accompanying drawings, wherein for the purpose of illustration is shown a preferred embodiment of my invention and wherein:—

Figure 1 is a side elevation showing a rim tool constructed in accordance with my invention applied to a rim, the parts being shown in the position which they occupy upon application and before the contraction of the rim is started;

Figure 2 is a view similar to that shown in Figure 1, the parts being illustrated in the position where the sections of the rim are separated ready for contraction in solid lines and in one of the contracted rim holding positions in dotted lines;

Figure 3 is a view similar to that shown in the previously described figures with the parts of the tool in the second contracted rim holding position;

Figure 4 is a side elevation of the rim tool detached, the parts being broken away;

Figure 5 is a section on the line 5—5 of Figure 3.

Referring now more particularly to the drawings, the numerals 10 and 11 indicate the adjacent ends of a resilient tire rim. These ends have, at adjacent ends, portions 12 and 13, which interlock when the rim is in assembled relation and which render it necessary that the rim be spread before one section thereof can be drawn inwardly of the other section and the rim collapsed. The flanges of the rim sections adjacent the ends thereof are formed with openings 14, for the reception of tools, whereby the spreading and contracting operation can be performed.

In accordance with my invention, I provide two pairs of levers 15 and 16. The upper end of each pair of levers is connected by pivoted bails 18 and the levers themselves adjacent their free ends are pivotally connected by a pivot bolt 19 upon one end of which a lever nut 20 is mounted to permit the pairs of levers to be contracted upon the pivot. This pivot bolt is preferably held against rotation with relation to one pair of levers, as indicated at 21. The levers 15 are considerably shorter than the levers 16 and are arranged inwardly thereof upon the pivot bolt. This pivot bolt passes through the levers at such a point that the free ends of the levers 15, when these levers are aligned with the levers 16, are spaced inwardly of the free ends of the levers 16. The free end of each lever upon the inner face thereof is provided with an inwardly extending lug 22 adapted for engagement in an opening 14 of the tire rim. Slidable upon the pivot bolt is the hub 23 of an arm 24, the outer end of which is provided with a head 25, the sides of which have flanges 26 extending in the same general direction as the pivot bolt and having their adjacent faces spaced apart a distance slightly greater than the width of the levers 15. These flanges have a depth approximately equal to the combined thickness of the two levers at either side of the structure thus produced.

In the use of the tool, the ends of the lugs 22 are inserted in the openings 14 of the rim flanges, the lugs 22 of the levers 15 being engaged in the openings 14 of the section 11, while those of the levers 16 are engaged in the openings of the section 10. The lever nut 20 is then rotated to move the levers toward one another until the lugs are unremovable from the openings 14. When first applied, the free ends of the levers 16 and the bail thereof will immediately overlie the end section 11 of the rim and will substantially parallel the same, as more clearly shown in Figure 1, while the levers 15 will extend substantially diametrically of the rim. To separate the sections, the foot is placed upon the levers 16 to prevent movement thereof and the levers 15 are forced downwardly toward the rim section 10. This first increases the distance between the free ends of the levers 15 and 16 and separates the sections 10 and 11 and then elevates the section 11, so that it may move inwardly of the section 10. If the section 11 is positioned to move inwardly of the section 10, the levers 16 may be freed, so that they may swing toward the section 10 of the rim and the two pairs of levers finally brought into alignment with one another and in engagement with the section 10. In this position, the arm 24 may be slid longitudinally of the pivot, until the flanges thereof simultaneously embrace the levers 15 and 16 at one side of the structure and the rim will be held in this position. The contraction thus provided is ordinarily sufficient to permit removal of the tire. If, however, this contraction is found insufficient, the upper ends of the levers 15 may be swung between the upper ends of the levers 16 toward the section 11, thus increasing the lap between the sections.

As the tension of the rim will at this time tend to cause the levers to swing back past a point where they are in alignment, the engagement of the head 25 with either of the levers 15 or 16 will prevent return movement of the levers and hold the tool locked in position. In event the contraction thus provided still proves insufficient, the movement of the levers 15 toward the section 11 may be continued still further and the head inserted between adjacent faces of the levers 15 and 16. It will be obvious that by a reversal of the procedure above set forth, the rim may be restored to position after the tire has been replaced thereon.

Since the construction hereinbefore set forth is capable of a certain range of change and modification without materially departing from the spirit of the invention, I do not limit myself to such specific structure except as hereinafter claimed.

I claim:

1. A tire tool for contracting split resilient rims comprising pivotally connected levers having at corresponding ends thereof lugs adapted to enter the openings formed at opposite sides of the split thereof, said levers being connected with the pivot thereof at points differently spaced from their lug bearing ends, said pivot extending to one side of the levers and a member slidable and oscillatable upon the pivot and having means engageable with said levers to maintain the levers in alignment with one another or to maintain the levers in crossed relation.

2. A tire tool for contracting split resilient rims comprising pivotally connected levers having at corresponding ends thereof lugs adapted to enter the openings formed at opposite sides of the split thereof, said levers being connected with the pivot thereof at points differently spaced from their lug bearing ends, said pivot extending to one side of the levers, a member slidable and oscillatable upon the pivot and having means engageable with said levers to maintain the levers in alignment with one another or to maintain the levers in crossed relation and means for maintaining said lugs in engagement in the openings of the rim comprising a second similar pair of levers the lugs of which are adapted to similarly engage in openings at the opposite side of the rim, the pivot of the first named pair of levers extending through and forming the pivot for the second pair, said pivot having at one end a head and at the opposite end a nut whereby said pairs of levers may be adjusted toward one another.

3. A tire tool for contracting split resilient rims comprising pivotally connected levers having at corresponding ends thereof lugs adapted to enter the openings formed at opposite sides of the split thereof, said levers being connected with the pivot thereof at points differently spaced from their lug bearing ends, said pivot extending to one side of the levers, a member slidable and oscillatable upon the pivot and having means engageable with said levers to maintain the levers in alignment with one another or to maintain the levers in crossed relation, means for maintaining said lugs in egagement in the openings of the rim comprising a second similar pair of levers the lugs of which are adapted to similarly engage in openings at the opposite side of the rim, the pivot of the first named pair of levers extending through and forming the pivot for the second pair, said pivot having at one end a head and at the opposite end a nut whereby said pairs of levers may be adjusted toward one another, and means connecting corresponding levers of the pairs for simultaneous movement.

4. A tire tool for contracting split resilient rims comprising pivotally connected levers having at corresponding ends thereof lugs adapted to enter the openings formed at opposite sides of the split thereof, said levers being connected with the pivot thereof at points differently spaced from their lug bearing ends, said pivot extending to one side of the levers, a member slidable and oscillatable upon the pivot and having means engageable with said levers to maintain the levers in alignment with one another or to maintain the levers in crossed relation, means for maintaining said lugs in engagement in the openings of the rim comprising a second similar pair of levers the lugs of which are adapted to similarly engage in openings at the opposite side of the rim, the pivot of the first named pair of levers extending through and forming the pivot for the second pair, said pivot having at one end a head and at the opposite end a nut whereby said pairs of levers may be adjusted toward one another, and bails pivotally connected to the corresponding ends of the levers of the pairs.

5. A tire tool for contracting split resilient rims comprising pivotally connected levers having at corresponding ends thereof lugs adapted to enter the openings formed at opposite sides of the split thereof, said levers being connected with the pivot thereof at points differently spaced from their lug bearing ends, said pivot extending to one side of the levers, a member slidable and oscillatable upon the pivot and having means engageable with said levers to maintain the levers in alignment with one another or to maintain the levers in crossed relation, means for maintaining said lugs in engagement in the openings of the rim comprising a second similar pair of levers the lugs of which are adapted to similarly engage in openings at the opposite side of the rim, the pivot of the first named pair of levers extending through and forming the pivot for the second pair, said pivot having at one end a head and at the opposite end a nut whereby said pairs of levers may be adjusted toward one another, and bails pivotally connected to the corresponding ends of the levers of the pairs, the bail connected ends of one set of the levers being of less length than the corresponding ends of the other set of levers whereby the first named set may be shifted between the last named set.

In testimony whereof I hereunto affix my signature.

PETE OLABARRIA.